(12) United States Patent
Schumacher

(10) Patent No.: US 6,978,885 B1
(45) Date of Patent: Dec. 27, 2005

(54) HINGE CONVEYOR CHAIN

(75) Inventor: Jeffrey A. Schumacher, Port Washington, WI (US)

(73) Assignee: Rexnord Industries, Inc., Milwaukee, WI (US)

( * ) Notice: Subject to any disclaimer, the term of this patent is extended or adjusted under 35 U.S.C. 154(b) by 0 days.

(21) Appl. No.: 10/899,545

(22) Filed: Jul. 27, 2004

(51) Int. Cl.$^7$ ............................................ B65G 17/06
(52) U.S. Cl. ................................................. 198/851
(58) Field of Search ................................ 198/850, 851, 198/852, 853, 957

(56) References Cited

U.S. PATENT DOCUMENTS

| | | | |
|---|---|---|---|
| 3,663,215 A | | 5/1972 | Tanczyn |
| 4,023,239 A | * | 5/1977 | Stolz ............................ 24/33 P |
| 4,024,605 A | * | 5/1977 | Henke .......................... 24/33 P |
| 4,195,887 A | * | 4/1980 | Ruddell ........................ 305/42 |
| 4,450,008 A | | 5/1984 | Andreini |
| 4,487,630 A | | 12/1984 | Crook |
| 4,611,710 A | | 9/1986 | Mitsufuji |
| 5,296,054 A | | 3/1994 | Lvovich |
| 5,573,106 A | * | 11/1996 | Stebnicki ...................... 198/853 |
| 5,579,898 A | * | 12/1996 | Nakagawa et al. ........... 198/851 |
| 5,660,939 A | | 8/1997 | Burdett |
| 5,678,683 A | * | 10/1997 | Stebnicki et al. ............ 198/853 |
| 5,957,268 A | * | 9/1999 | Meulenkamp ................ 198/850 |
| 6,036,002 A | * | 3/2000 | Kobayashi et al. .......... 198/853 |
| 6,164,439 A | * | 12/2000 | Stebnicki et al. ............ 198/853 |
| 6,245,289 B1 | | 6/2001 | Dodd |
| 6,439,378 B1 | * | 8/2002 | MacLachlan ................ 198/850 |
| 6,648,129 B2 | * | 11/2003 | Sedlacek ...................... 198/850 |

OTHER PUBLICATIONS

Ugine 204 CU Material Property Data Sheet (Mar., 2004).
AK Steel 201 Material Property Data Sheet (Nov. 1, 1999).
AK Steel 430 Material Property Data Sheet (Feb. 20, 2001).
Stainless Steel 430 Material Property Data Sheet (Jul. 10, 2004).
Stainless Steel 431 Material Property Data Sheet (Jul. 10, 2004).
Stainless Steel 304 Material Property Data Sheet (Jul. 10, 2004).
Super Alloy Nitronic 32 (tm) Material Property Data Sheet (Jul. 10, 2004).

* cited by examiner

*Primary Examiner*—Douglas Hess
(74) *Attorney, Agent, or Firm*—Quarles & Bradly LLP

(57) ABSTRACT

A hinge conveyor chain includes at least two links, each of the links include a pin engaging surface for engaging a pin hingedly coupling the at least two links together. A pin hingedly coupling the at least two links includes an outwardly facing surface slidably engaging at least one of the pin engaging surfaces of the at least two links. One of the outwardly facing surface and the at least one pin engaging surfaces of the at least two links is formed from a steel alloy with at least about 2.5 wt. % Cu and the other of the outwardly facing surface and the at least one of the pin engaging surfaces of the at least one of the at least two links is formed from a stainless steel.

11 Claims, 3 Drawing Sheets

HINGE CONVEYOR CHAIN

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The invention relates to the use of steel alloys in chain pins for hinge conveyor chains, in particular to alloys of stainless steel for use in such chain pins in combination with chain links manufactured from stainless steel.

Stainless-steel hinge conveyor chains are usually deployed in industrial applications where, in mechanical terms, heavy demands are made on the conveyor chains. Thus, stainless-steel conveyor chains can be loaded considerably more heavily than conveyor chains from plastic. They also offer a good resistance to external influences, particularly to the action of dirt and/or (remains of) product to be conveyed, such as for instance to street dirt or other dirt coming from crates when crates are conveyed or to glass fragments (pieces or glass powder) when (reused) bottles are conveyed in, for instance, the beverage industry.

When objects are conveyed by means of conveyor chains, it is sometimes important that the objects can somewhat slide over the surface of the chain. This may be achieved in practice by deploying the stainless-steel conveyor chains either lubricated or unlubricated. The term lubricated is understood to mean that, during the conveyance, a layer of lubricant is applied, usually in the form of an aqueous solution of a (synthetic) lubricant, such as soap. In an unlubricated operation, the surface of the chain needs to be so smooth that a sufficiently low frictional resistance can already be achieved without lubricant.

With both lubricated and unlubricated hinge conveyor chain systems, in use, wear occurs with the passage of time. It has been found that this wear particularly affects the pins which connect the individual links of the chain with each other. Due to the wear of the pin, the conveyor chain will become longer, which inter alia results in skipping of the chain on the driving gear, so that the conveying function is lost. Also, the mutual play between the links which results from wear of the pins will generally lead to more failures in the conveyance, for instance in that, on a worn conveyor chain, products easily fall over or become damaged in another manner. It is even possible for the conveyor chain to break as a result of the wear. In this context, it is noted that the speeds at which the conveyor chains are driven can be very high. In particular if single-line mass transport is desired, for instance after a parallel product flow merges into a single serial flow (for instance in a filling apparatus for bottles), the speed of the single-line chains can increase considerably, to no less than 80 m/min or more.

In addition, high demands are made on the life span of the conveyor equipment. For some applications, a conveyor chain needs to be able to operate without failure for at least six years. For lower speeds, ten years is no exception.

SUMMARY OF THE INVENTION

The present invention provides a hinge conveyor chain including at least two links. Each of the links include a pin engaging surface for engaging a pin hingedly coupling the at least two links together. A pin hingedly coupling the at least two links includes an outwardly facing surface slidably engaging at least one of the pin engaging surfaces of the at least two links. One of the outwardly facing surface and the at least one pin engaging surfaces of the at least two links is formed from a steel alloy with at least about 2.5 wt. % Cu and the other of the outwardly facing surface and the at least one of the pin engaging surfaces of the at least one of the at least two links is formed from a stainless steel.

A general objective of the present invention is to provide a metal hinge conveyor chain that exhibits less wear, and thus less elongation, over a period of use than prior hinge conveyor chains. This objective is accomplished by forming one of the outer surface of the pin and a pin engaging surface of at least one of the links from a steel alloy including at least about 2.5 wt. % copper and forming the other of the outer surface of the pin and the pin engaging surface of the link from a stainless steel.

The foregoing and other objectives and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

The invention will now be further described with reference to an exemplary embodiment shown in a drawing, in which.

The Figures are only diagrammatic representations of a preferred embodiment of the invention and are given by way of non-limiting exemplary embodiment. In the Figures, same or corresponding parts are designated by the same reference numerals.

DETAILED DESCRIPTION OF PREFERRED EMBODIMENTS

Figure 1:
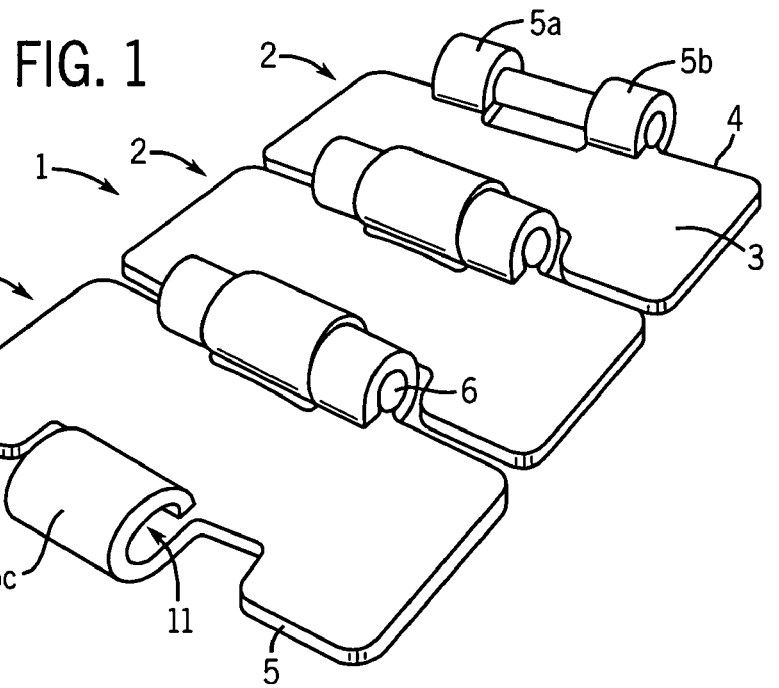
FIG. 1 shows a perspective bottom view of a number of successive links of a hinge conveyor chain.
Figure 2:
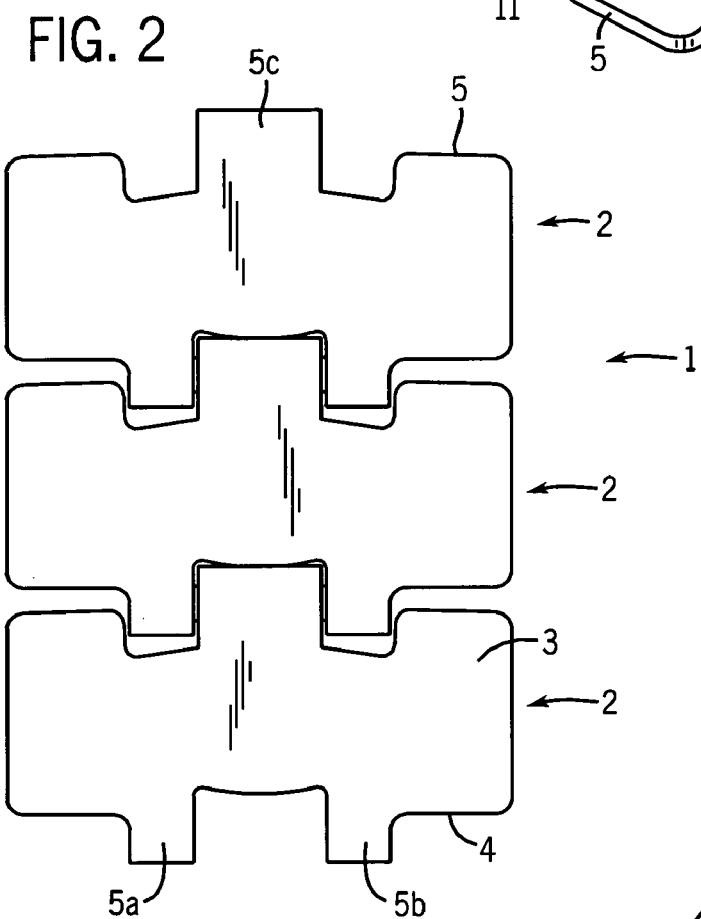
FIG. 2 shows a diagrammatic top plan view of the chain of FIG. 1.

FIGS. 1 and 2 show a hinge conveyor chain 1 comprising a series of successive links 2 formed from a steel alloy having no more than about 18 wt. % Cr. The links 2 are, as usual, hingedly connected to each other by pins 6 to form an endless chain. In the embodiment described herein, the chain pins 6 are manufactured from a steel alloy comprising at least 2.5 wt. % Cu, so that the material of the chain pin 6 is substantially non-seizing to the steel alloy of the links 2.

Each link 2 has a substantially plate-shaped top plate 3 which forms a conveying surface. Near a front side 4 of the top plate 3, two spaced apart, curled up link ends 5A, 5B form hinge loops defining coaxial openings for receiving one of the chain pins 6. Near a back side 5 of the top plate 3, a single curled up link end 5C forms a hinge loop defining an opening for receiving a different chain pin 6. The single curled up link end 5C is received in the free interspace between the link ends 5A, 5B on the front side 4 of the adjacent link 2.

Preferably, the links are formed from Type 201 Stainless Steel comprising the following chemical composition (in wt. %):

| | |
|---|---|
| C | ≦0.15 |
| Cr | 16–18 |
| Mn | 5.5–7.5 |
| Mo | 0.2–0.5 |
| P | ≦0.06 |
| Si | ≦1.0 |
| S | ≦0.03 |
| Ni | 3.5–5.5 |

The balance of the Type 201 Stainless Steel is iron and impurities.

The link ends 5A, 5B and 5C of successive links are hingedly coupled by means of the steel chain pin 6 reaching though the hinge loops, i.e. received in the aligned openings of the interdigitated link ends of adjacent links 2. Each hinge loop includes an inwardly facing pin engaging surface 11 that engages the pin 6 reaching through the hinge loops. The chain pin 6 is preferably, clamped in the link ends 5A, 5B of one link 2 and slidably engaging the link end 5C of the adjacent link 2 which allows the adjacent links 2 to pivotally move relative to each other.

Figure 3:
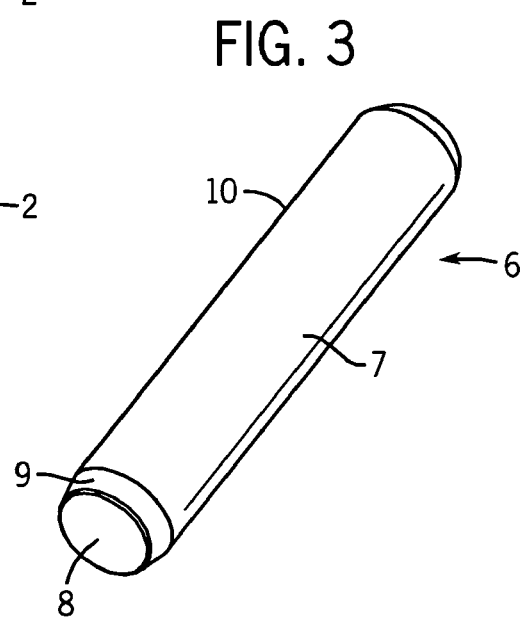
FIG. 3 shows a perspective view of a chain pin from the chain of FIGS. 1 and 2.

As shown in FIG. 3, each chain pin 6 comprises a substantially cylindrical, steel body 7 having end faces 8. The end faces 8 have chamfered circumferential edges 9 which substantially smoothly connect to a radially outwardly facing surface 10 of the chain pin 6. Preferably, the chain pin 6 are formed from Ugine 204 Cu Stainless Steel comprising the following chemical composition (in wt. %):

| | |
|---|---|
| C | <0.08 |
| Cr | 16–17 |
| Mn | 6.5–8.5 |
| Mo | 0.2–0.5 |
| P | <0.04 |
| Si | 0.5–1.5 |
| S | <0.01 |
| Ni | 1.5–2 |
| Cu | 2.5–3.5 |

The balance of the Ugine 204 Cu Stainless Steel is iron and impurities.

In one embodiment, the chain pin 6 has a diameter of less than 1 cm, preferably approximately 5–8 mm, in particular 6.35 mm, and a length of approximately 20–150 mm. Of course, preferred dimensions of the chain pin depend on the width of the chain and the number of link ends to be coupled. Accordingly, a chain pin incorporating the present invention can have any physical dimensions without departing from the scope of the invention.

Successive links 2 pivot relative to each other about an axis located in or along the conveying surface and extending substantially transverse to the conveying direction indicated by arrow P. Thus, the chain 1 can be guided around a chain sprocket. Further, in this exemplary embodiment, the chain pin 6 is included in the middle link end 5C with play, while the chain pin 6 is clamped in the link ends 5A, 5B. This allows successive links 2 to pivot relative to each other about an axis extending substantially transverse to the conveying surface, so that the chain 1 can be guided along a bend in a flat surface.

The pins according to the invention can be manufactured in the known manners, for instance by turning or by taking drawn wire as starting material and cutting it. Preferably, the pins for use in the conveyor chain according to the invention are manufactured from drawn wire, more preferably from cold-drawn wire.

The pins can be hardened. It has been found that the wear of hardened pins is more than 30% lower than that of unhardened pins. The hardening takes place in a manner known to a skilled person by means of cold working.

It is not necessary to manufacture the whole pin according to the invention from the above-defined steel. According to the invention, such a steel may also be present as an outer jacket layer on a pin from a different material. Such a layer usually has a thickness of a few tenths of millimeters to a few millimeters, for instance 0.5–1.5 mm, typically approximately 1 mm. A pin with such a jacket layer can be obtained in manners known to a skilled person, for instance by subjecting the pin to a surface treatment.

The pins are introduced into the links in the usual manner, for the purpose of forming the conveyor chain according to the invention.

The chain described above was tested to evaluate the pin-joint chain wear compared to chains formed using other materials. The chain of the present invention, designated Chain C in the graph of FIG. 4, was compared to the following four chains: Chain A includes links formed from Type 431 Stainless Steel joined together by pins formed from Type 431 Stainless Steel; Chain B is formed from the same materials as Chain A; Chain C includes links formed from Type 201 Stainless Steel joined together by pins formed from Ugine 204 Cu Stainless Steel; Chain D includes links formed from Type 430 Stainless Steel joined together by pins formed from Type 304 Stainless Steel; and Chain E includes links and pins formed from 1045 Steel Alloy.

Each chain evaluated was run unlubricated on a standard conveyor bed at 500 feet per minute under 100 lbs. The chain is urged around the conveyor bed by twenty-five (25) tooth sprockets. Each complete travel of the chain around the conveyor bed is a cycle. The elongation of the chain was periodically measured during the test to determine the percent elongation of the chain as a function of cycles.

Figure 4:
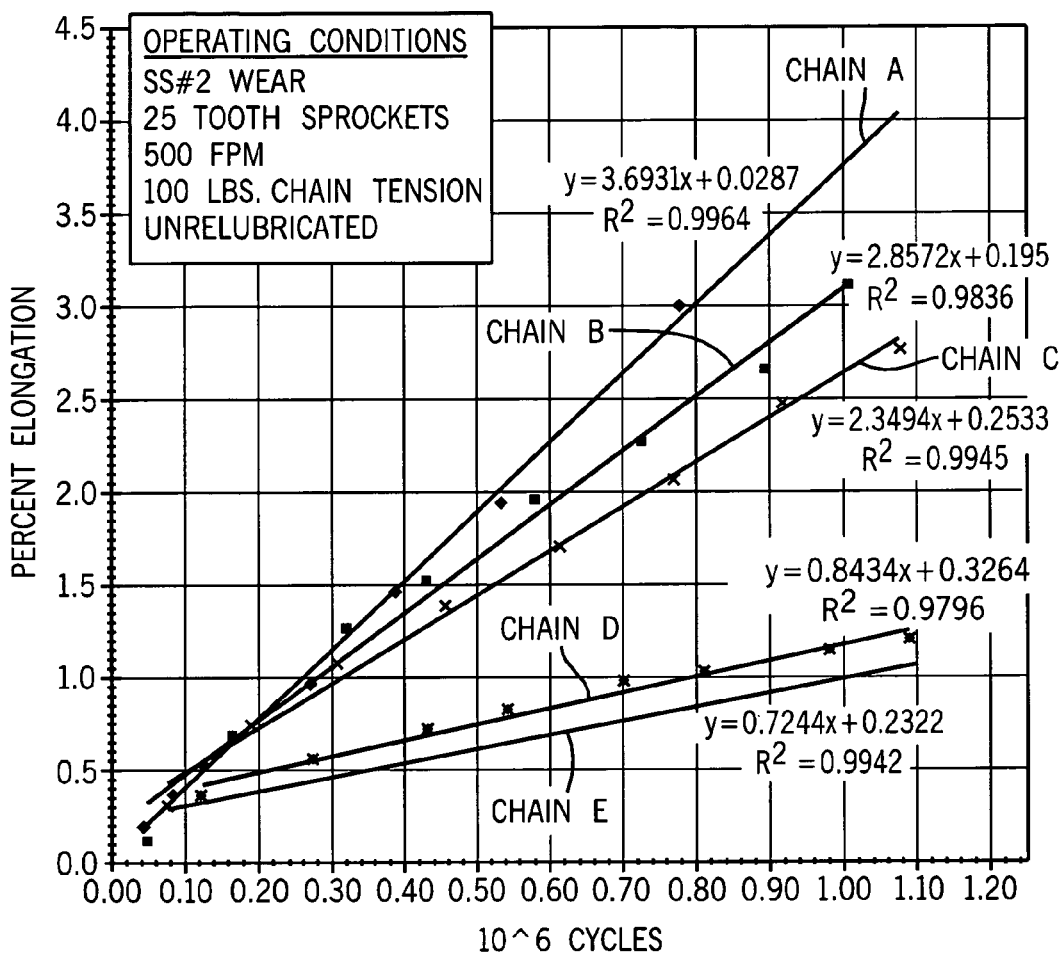
FIG. 4 shows test results in graph form of the percent elongation of the chain disclosed in FIG. 1 as a function of cycles compared to four other chains formed from a different combination of materials.

The results of this first test are shown in the graph of FIG. 4. In the graph, the percent elongation of Chain C incorporating the present invention is shown to be less as a function of cycles compared to the other chains in the test.

A second test of four chains was also conducted under the same operating conditions as the first test. In the second test, the chain of the present invention, designated Chain G in the graph of FIG. 5, was compared to the following three chains: Chain F includes links formed from Type 201 Stainless Steel joined together by pins formed from Nitronic 32 Stainless Steel; Chain G includes links formed from Type 201 Stainless Steel joined together by pins formed from Ugine 204 Cu Stainless Steel; Chain H includes links formed from Type 201 Stainless Steel joined together by pins formed from F202N Stainless Steel; and Chain I includes links and pins formed from 1045 Steel Alloy.

Figure 5:
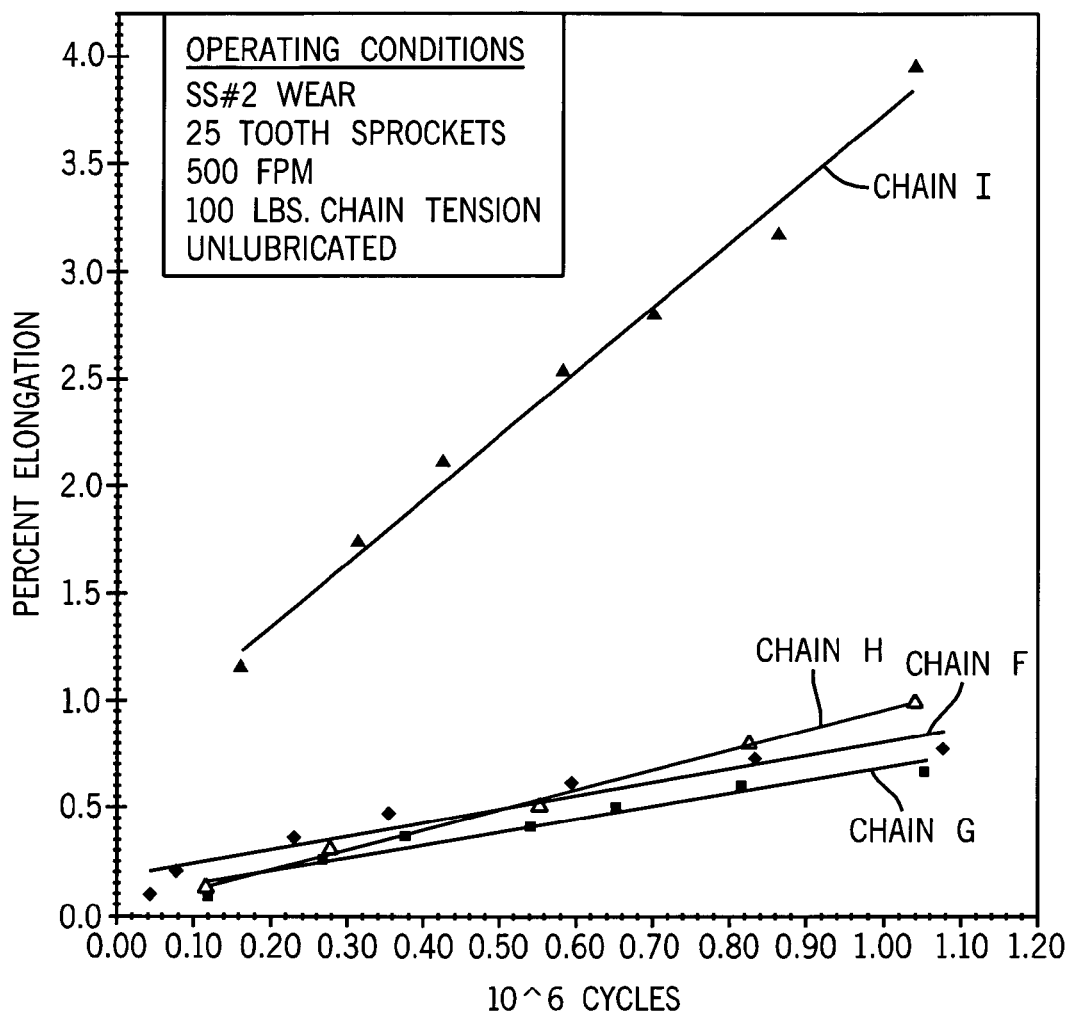
FIG. 5 shows additional test results in graph form of the percent elongation of the chain disclosed in FIG. 1 as a function of cycles compared to three other chains formed from a different combination of materials.

The results of this second test are shown in the graph of FIG. 5. In the graph, the percent elongation of Chain G incorporating the present invention is shown to be less as a function of cycles compared to the other chains in the test.

As can be seen from both tests, the chain incorporating the present invention exhibits surprisingly less elongation, and thus less wear, than the other chains over the same period of time, or cycles. It is believed that the addition of Cu in the steel alloy forming the chain pin provides a self-lubricating effect when engaging the stainless steel material of the links during the relative movement of the chain pin and links, as the chain travels around the sprockets.

The invention is not limited to the embodiment shown here. For instance, successive links 2 may comprise link ends and top plates having another shape than shown in the drawing. Also, the chain pin may have a varying diameter, for instance when it is stepped or tapered over its length. Moreover, since the chain pin and links move relative to each other, the chain pin can be manufactured from a steel alloy containing less than 2.5 wt. % Cu and the one or more links connected by the chain pin can contain at least 2.5 wt. % Cu without departing from the scope of the invention. In addition, the chain pin may have a body formed from a steel alloy, such as any of the steel alloys disclosed herein, with a layer formed from a different steel alloy having non-seizing properties, such as a steel alloy with at least 2.5 wt. % Cu, defining the chain pin radially outwardly facing surface.

While there has been shown and described what are at present considered the preferred embodiments of the invention, it will be obvious to those skilled in the art that various changes and modifications can be made therein without departing from the scope of the invention defined by the appended claims. Such variations will be clear to a skilled person and are understood to be within the scope of the invention as set forth in the appended claims.

I claim:

1. A hinge conveyor chain comprising:
    at least two links, each of said links including a pin engaging surface for engaging a pin hingedly coupling said at least two links together;
    a chain pin hingedly coupling said at least two links, said chain pin including an outwardly facing surface slidably engaging at least one of said pin engaging surfaces of said at least two links, and one of said outwardly facing surface and said at least one of said pin engaging surfaces of said at least two links being formed from a steel alloy with at least about 2.5 wt. % Cu and the other of said outwardly facing surface and said at least one of said pin engaging surfaces of said at least one of said at least two links is formed from a stainless steel.

2. The hinge conveyor chain as in claim 1, in which said stainless steel contains no more than about 18 wt. % Cr.

3. The hinge conveyor chain according to claim 1, in which each of said at least two links include a top plate which forms a conveying surface, which top plate is, near a front and back side, provided with link ends, wherein the link ends of adjacent links are hingedly coupled by said chain pin reaching through the link ends.

4. The hinge conveyor chain according to claim 1, wherein said one of said outwardly facing surface and said at least one pin engaging surface of said least one of said two links is formed from a steel alloy with no more than about 3.5 wt. % Cu.

5. The hinge conveyor chain according to claim 1, wherein said one of said outwardly facing surface and said at least one pin engaging surface of said at least one of said at least two links is formed from a steel alloy with no more than about 2.0 wt. % Ni.

6. The hinge conveyor chain according to claim 1, wherein said chain pin at least substantially consists of a steel alloy.

7. The hinge conveyor chain according to claim 1, wherein said one of said outwardly facing surface and said at least one pin engaging surface of said at least one of said at least two links comprises a steel alloy with the following composition (in wt. %):

| | |
|---|---|
| C | <0.08 |
| Cr | 16–17 |
| Mn | 6.5–8.5 |
| Mo | 0.2–0.5 |
| P | <0.04 |
| Si | 0.5–1.5 |
| S | <0.01 |
| Ni | 1.5–2. |

8. The hinge conveyor chain according to claim 7, wherein the other of said outwardly facing surface and said at least one pin engaging surface of said at least one of said at least two links comprises a steel alloy with the following composition (in wt. %):

| | |
|---|---|
| C | ≦0.15 |
| Cr | 16–18 |
| Mn | 5.5–7.5 |
| Mo | 0.2–0.5 |
| P | ≦0.06 |
| Si | ≦1.0 |
| S | ≦0.03 |
| Ni | 3.5–5.5. |

9. The hinge conveyor chain according to claim 1, wherein said one of said outwardly facing surface and said at least one pin engaging surface of said at least one of said at least two links is formed from Ugine 204 Cu.

10. The hinge conveyor chain according to claim 9, wherein the other of said outwardly facing surface and said at least one pin engaging surface of said at least one of said at least two links is formed from Type 201 Stainless Steel.

11. The hinge conveyor chain according to claim 1, in which at least one of said links is formed from the same material as said at least one pin engaging surface.

* * * * *